United States Patent
Sawayama

(10) Patent No.: US 10,581,204 B2
(45) Date of Patent: Mar. 3, 2020

(54) RECEPTACLE-SIDE CONNECTOR AND ELECTRONIC DEVICE

(71) Applicant: SHARP KABUSHIKI KAISHA, Sakai, Osaka (JP)

(72) Inventor: Kohji Sawayama, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/767,319

(22) PCT Filed: Oct. 19, 2016

(86) PCT No.: PCT/JP2016/080965
§ 371 (c)(1),
(2) Date: Apr. 10, 2018

(87) PCT Pub. No.: WO2017/115536
PCT Pub. Date: Jul. 6, 2017

(65) Prior Publication Data
US 2018/0301851 A1    Oct. 18, 2018

(30) Foreign Application Priority Data
Dec. 28, 2015 (JP) ................. 2015-257046

(51) Int. Cl.
*H01R 12/53*  (2011.01)
*H01R 13/6585*  (2011.01)
(Continued)

(52) U.S. Cl.
CPC ........... *H01R 13/6585* (2013.01); *G06F 1/18* (2013.01); *G06F 3/00* (2013.01); *H01R 12/725* (2013.01);
(Continued)

(58) Field of Classification Search
CPC ........... H01R 13/6585; H01R 13/6596; H01R 12/775; H01R 13/405; H01R 13/6582; H01R 13/6666; H01R 12/722; H01R 24/60; H01R 12/53; H01R 2107/00; G06F 1/18; G06F 3/00
See application file for complete search history.

(56) References Cited

U.S. PATENT DOCUMENTS 8,167,652 B1 * 5/2012 Ju .................... H01R 12/714
29/592.1
2015/0004839 A1  1/2015 Wang et al.
(Continued)

FOREIGN PATENT DOCUMENTS

CN   203871583 U   10/2014
CN   105048148 A   11/2015
JP   2006-048594 A   2/2006

*Primary Examiner* — Truc T Nguyen
(74) *Attorney, Agent, or Firm* — ScienBiziP, P.C.

(57) ABSTRACT

The present invention effectively prevents a short circuit from occurring between a power supply terminal and a ground electrode. A receptacle-side connector (3) includes a metal plate (mid-plate 32) and a shell part (23). An edge surface (end surface part 32a) of the metal plate, which edge surface is located at an end surface facing a first side toward an opening (23a) of the shell part (23) and which corresponds to a position of a power supply terminal (Vbus terminal 25), is shaped so as to be set back toward a second side opposite the first side.

6 Claims, 9 Drawing Sheets

(51) Int. Cl.

| | | |
|---|---|---|
| *G06F 1/18* | (2006.01) | |
| *G06F 3/00* | (2006.01) | |
| H01R 12/72 | (2011.01) | |
| H01R 24/62 | (2011.01) | |
| H01R 13/405 | (2006.01) | |
| H01R 13/6596 | (2011.01) | |
| H01R 13/66 | (2006.01) | |
| *H01R 12/77* | (2011.01) | |
| *H01R 13/6582* | (2011.01) | |
| *H01R 24/60* | (2011.01) | |
| *H01R 107/00* | (2006.01) | |

(52) U.S. Cl.
CPC ....... *H01R 13/405* (2013.01); *H01R 13/6596* (2013.01); *H01R 13/6666* (2013.01); *H01R 24/62* (2013.01); *H01R 12/53* (2013.01); *H01R 12/722* (2013.01); *H01R 12/775* (2013.01); *H01R 13/6582* (2013.01); *H01R 24/60* (2013.01); *H01R 2107/00* (2013.01)

(56) References Cited

U.S. PATENT DOCUMENTS

| | | | |
|---|---|---|---|
| 2015/0171574 A1 | 6/2015 | Little et al. | |
| 2015/0200504 A1* | 7/2015 | Little | H01R 24/60 439/345 |
| 2015/0222059 A1* | 8/2015 | Little | H01R 13/6587 439/607.55 |
| 2015/0364888 A1* | 12/2015 | Yu | H01R 13/6585 264/250 |
| 2016/0049751 A1* | 2/2016 | Chuang | H01R 13/6581 439/217 |
| 2016/0118752 A1* | 4/2016 | Guo | H01R 13/6585 439/78 |
| 2017/0040721 A1 | 2/2017 | Tsai et al. | |
| 2017/0222342 A1* | 8/2017 | Ho | H01R 12/71 |
| 2017/0264054 A1* | 9/2017 | Zhao | H01R 13/5202 |
| 2017/0264722 A1* | 9/2017 | Zhong | H04M 1/0249 |
| 2017/0271823 A1* | 9/2017 | Zhao | H01R 13/405 |
| 2017/0338576 A1* | 11/2017 | Sato | H01R 4/184 |
| 2018/0145462 A1* | 5/2018 | Feng | H01R 13/6596 |
| 2018/0226758 A1* | 8/2018 | Chen | H01R 12/58 |
| 2018/0366884 A1* | 12/2018 | Tseng | H01R 13/6594 |

\* cited by examiner

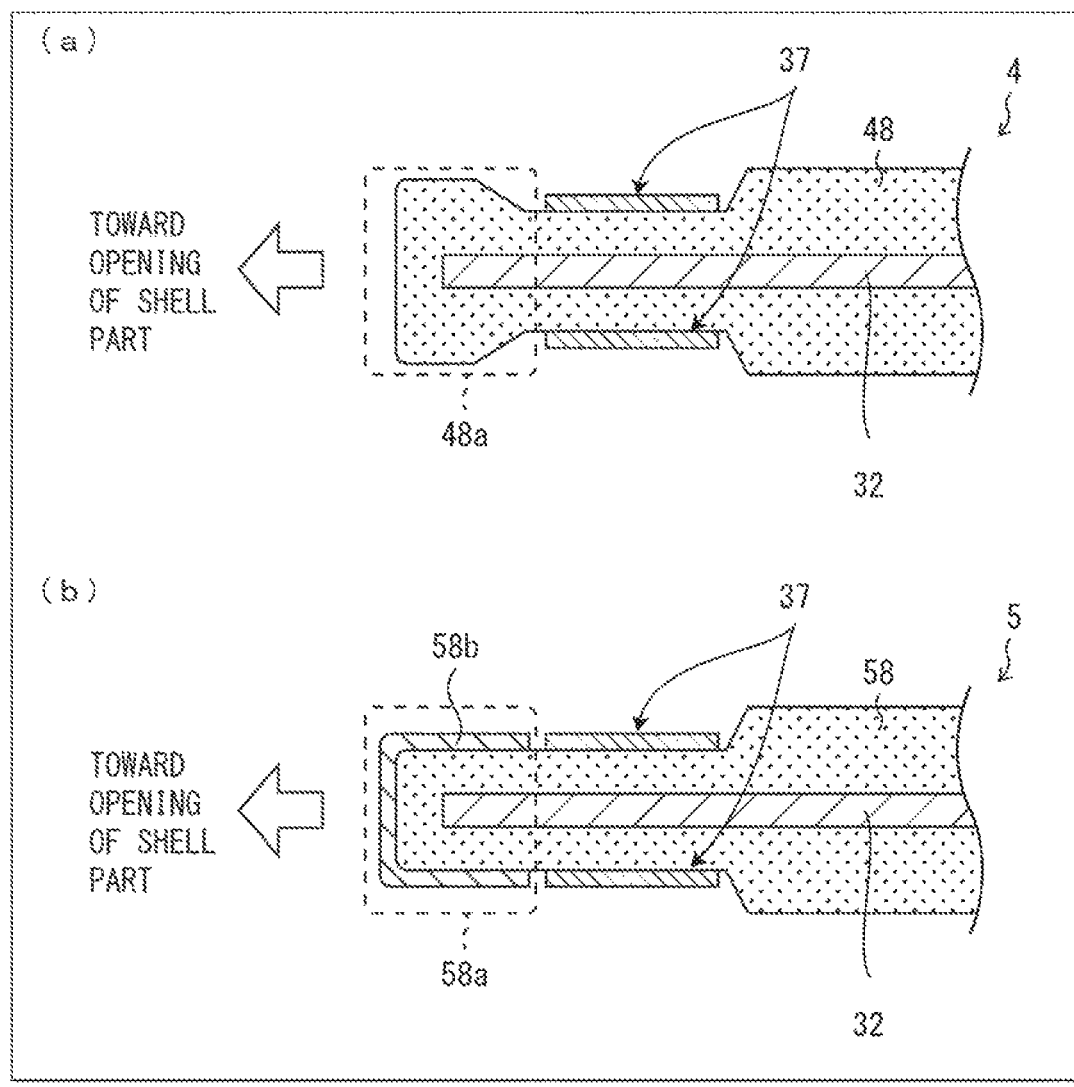

RECEPTACLE-SIDE CONNECTOR AND ELECTRONIC DEVICE

TECHNICAL FIELD

The present invention relates to (i) a receptacle-side connector for use in electrical connection between an electronic apparatus and an external apparatus and (ii) an electronic apparatus including the receptacle-side connector.

BACKGROUND ART

Conventionally, the Universal Serial Bus (USB) standard has been widely used as a standard for connecting, to an electronic apparatus such as a smartphone, external peripheral equipment such as an alternating current (AC) adapter. According to a USB interface in which the USB standard is used, a device ordinarily includes an overcurrent protection mechanism on a host-side therein as measures to protect the device from an overcurrent which is caused by, for example, an unexpected short circuit of a power supply.

However, in the market, there are (i) USB hosts in which no overcurrent protection mechanisms are included and (ii) USB cables in which wiring errors are made. Therefore, techniques are being developed to notify a user in a case where an overcurrent flows as a result of using such a USB host and such a USB cable.

Patent Literature 1, for example, discloses a USB device which includes an overcurrent preventing section, an overcurrent state detecting section, and an overcurrent state notifying section that are provided for signal lines and electric power lines. The USB device makes it possible to notify a user of an abnormal connection state with use of the overcurrent state detecting section and the overcurrent state notifying section even in a case where, for example, USB cables with wiring errors are used.

CITATION LIST

Patent Literature

[Patent Literature 1]
Japanese Patent Application Publication Tokukai No. 2006-48594 (Publication date: Feb. 16, 2006)

SUMMARY OF INVENTION

Technical Problem

However, according to the technique disclosed in Patent Literature 1, a short circuit, which occurs at a device-side connector provided in the USB device, is detected and notified to a user in a case where electric power is supplied from a USB host device to the USB device via a USB cable. Therefore, an overcurrent may flow to a circuit before a user notices and addresses a short circuit, so that the USB device may encounter a problem or the like.

In addition, the USB device of Patent Literature 1 includes a positive temperature coefficient (PTC) fuse as the overcurrent preventing section. However, the fuse functions to cause an overcurrent, which has flowed to the device-side connector, to a pathway to which an LED or the like is connected. This means that the fuse does not prevent an overcurrent from flowing to the device-side connector. Furthermore, there are phenomena in which, for example, repeated insertion and removal the device-side connector of the USB device causes an insulating member, which covers a ground potential part in the connector, to be peeled off, so that the ground potential part is exposed. Therefore, in a case where, for example, a foreign substance intrudes into a shell part of the device-side connector, a short circuit is unfortunately formed between the exposed ground potential part and a power supply terminal via the foreign matter or terminal.

The present invention has been made in view of the problems, and it is an object of the present invention to provide a receptacle-side connector which effectively prevents a short circuit from occurring between a power supply terminal and a ground electrode as a result of, for example, repeated insertion and removal of the receptacle-side connector.

Solution to Problem

In order to attain the object, a receptacle-side connector in accordance with an aspect of the present invention is a receptacle-side connector which is provided in an electronic apparatus and is used to electrically connect the electronic apparatus to an external apparatus by fitting together with a plug-side connector for electrically connecting the electronic apparatus to the external apparatus via a cable, the receptacle-side connector including: at least a terminal block including a power supply terminal, a ground terminal, and a signal terminal, the receptacle-side connector further including: a metal plate which serves as a ground plane; and a shell part which forms an outer profile of the receptacle-side connector and which is electrically conducive, in the shell part, an edge surface of the metal plate, which edge surface is located at an end surface facing a first side toward an opening of the shell part and which corresponds to a position of the power supply terminal, being shaped so as to set back toward a second side opposite the first side.

In order to attain the object, a receptacle-side connector in accordance with an aspect of the present invention is a receptacle-side connector which is provided in an electronic apparatus and is used to electrically connect the electronic apparatus to an external apparatus by fitting together with a plug-side connector for electrically connecting the electronic apparatus to the external apparatus via a cable, the receptacle-side connector including: at least a terminal block including a power supply terminal, a ground terminal, and a signal terminal, the receptacle-side connector further including: a metal plate which serves as a ground plane; and a shell part which forms an outer profile of the receptacle-side connector and which is electrically conducive, when viewed in a cross section defined by a direction in which the power supply terminal extends and by a direction perpendicular to a surface of the metal plate, an edge surface of the metal plate, which edge surface is facing a first side toward an opening of the shell part, being shaped so as to set back toward a second side opposite the first side.

Advantageous Effects of Invention

With an aspect of the present invention, it is possible to provide a receptacle-side connector which effectively prevents, by preventing an electrical connection between a metal plate and a power supply terminal, a short circuit from occurring between the power supply terminal and a ground electrode via the metal plate.

Figure 7:
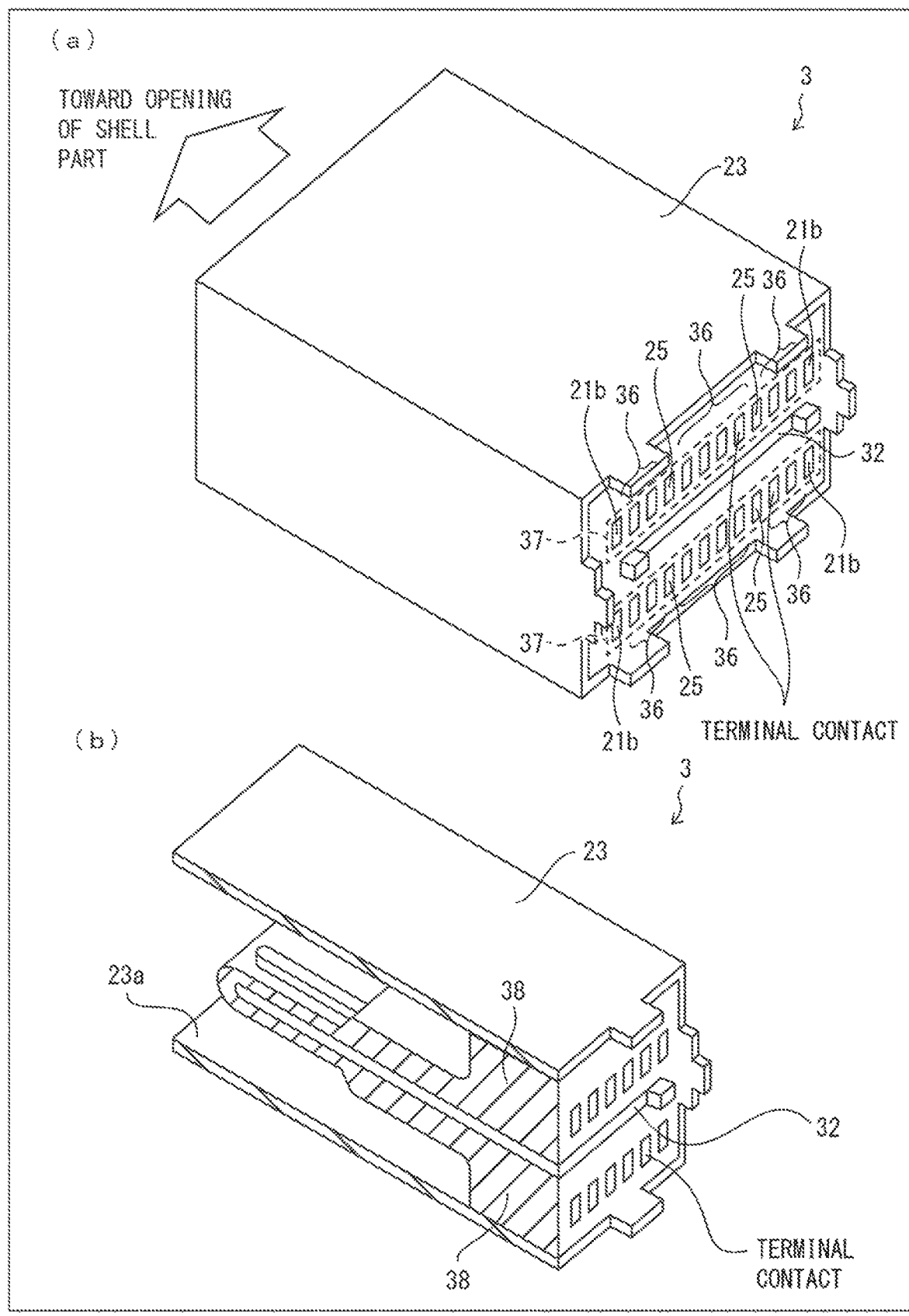

(a) of FIG. 7 is a perspective view schematically illustrating a configuration of a receptacle-side connector in accordance with Embodiment 1 of the present invention. (b) of FIG. 7 is a cross-sectional view schematically illustrating an internal structure of the receptacle-side connector.

Figure 8:
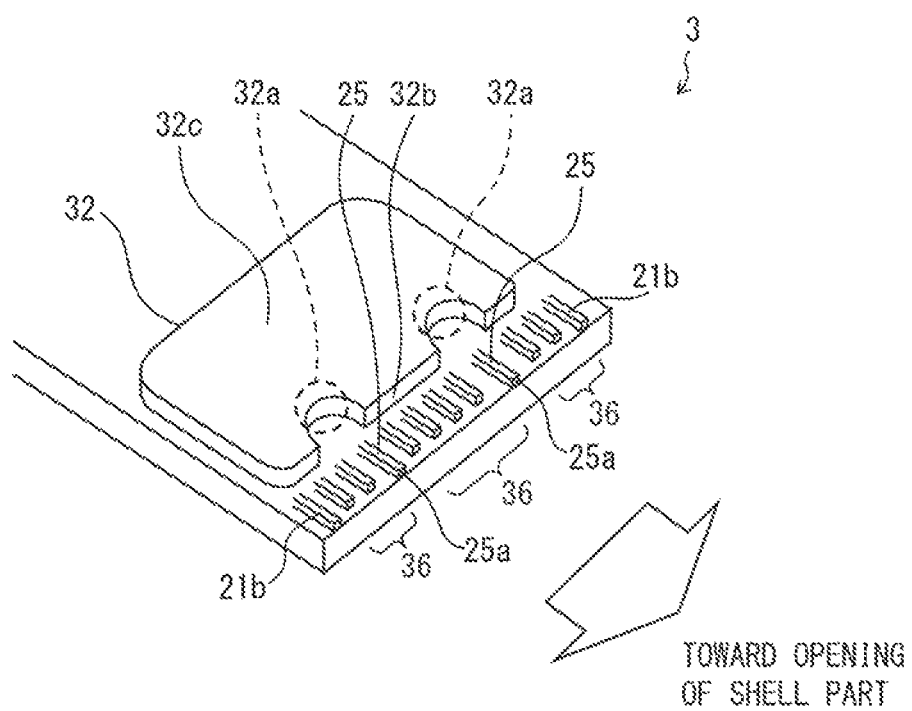

FIG. 8 is a view schematically illustrating (i) a shape of a mid-plate included in the receptacle-side connector illustrated in FIG. 7 and (ii) positional relation between the mid-plate and a terminal block.

Figure 9:
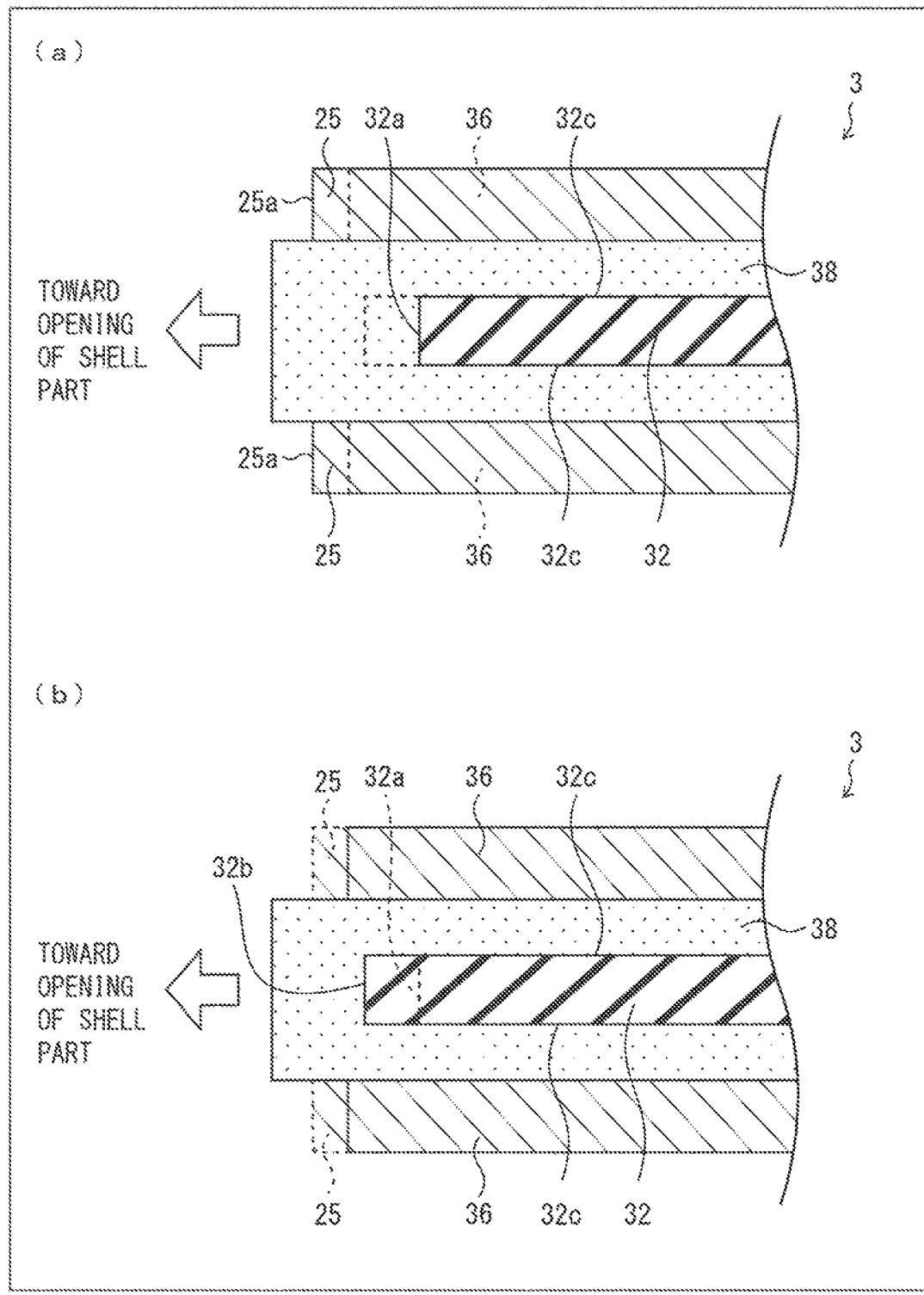

(a) of FIG. 9 is a cross-sectional view illustrating a configuration of main parts of the receptacle-side connector illustrated in FIG. 7 viewed in a cross section that is defined by a direction in which a Vbus terminal extends and a direction perpendicular to a surface of the mid-plate. (b) of FIG. 9 is a cross-sectional view illustrating a configuration of main parts of the receptacle-side connector illustrated in FIG. 7 viewed in a cross section that is defined by a direction in which a signal terminal extends and the direction perpendicular to the surface of the mid-plate.

(a) and (b) of FIG. 10 are each a cross-sectional view schematically illustrating an internal structure of a receptacle-side connector in accordance with the another embodiment of the present invention.

DESCRIPTION OF EMBODIMENTS

Reference Embodiment

The following description will discuss details of reference embodiments for achieving prevention of short circuit that may occur between a power supply terminal and a ground electrode, with reference to FIGS. 1 through 6. The present reference embodiment and the subsequent embodiments will each discuss an example in which a plug-side connector in accordance with the reference embodiment and with an embodiment of the present invention is electrically connected to an AC adapter (external apparatus) 500 via a cable 15 (see FIG. 1). In the example, receptacle-side connector in accordance with the reference embodiment and an embodiment of the present invention is provided on a smartphone (electronic apparatus) 600 (see FIG. 1).

Note, however, that the external apparatus, which is electrically connected to the plug-side connector in accordance with the reference embodiment and an embodiment of the present invention is not limited to the AC adapter 500, but can be, for example, a personal computer (PC) or a portable battery. The electronic apparatus, in which the receptacle-side connector in accordance with the reference embodiment and an embodiment of the present invention is provided, is not limited to the smartphone 600, but can be, for example, a mobile phone, a tablet device, or a portable gaming device. The plug-side connector and the receptacle-side connector in accordance with the reference embodiment and an embodiment of the present invention can be applied to an HDMI (registered trademark, High Definition Multimedia Interface).

<Configurations of Plug-Side Connector and Receptacle-Side Connector>

Figure 1:
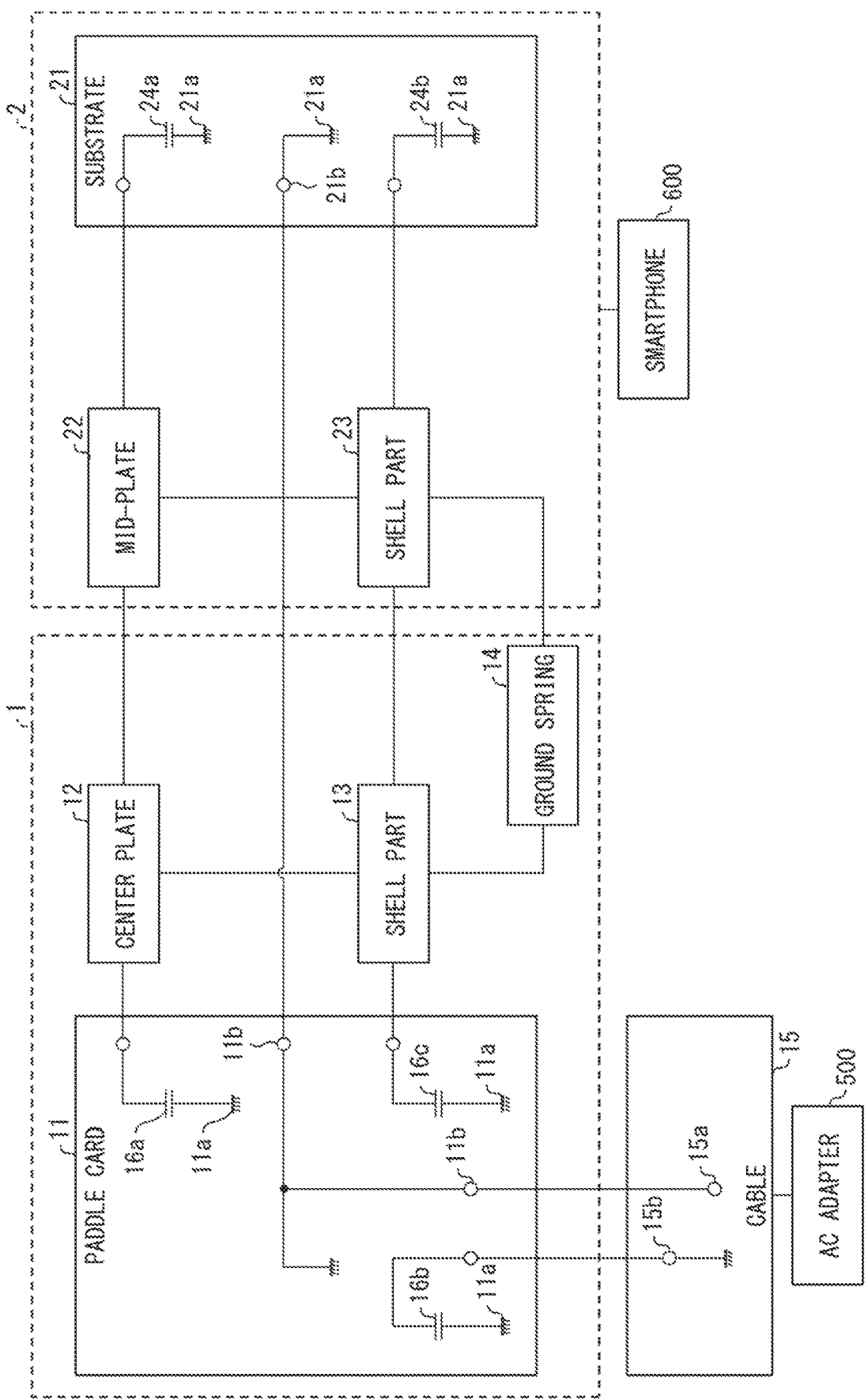
FIG. 1 is a block diagram illustrating main configurations of a plug-side connector and a receptacle-side connector in accordance with a reference embodiment of the present invention.
Figure 2:
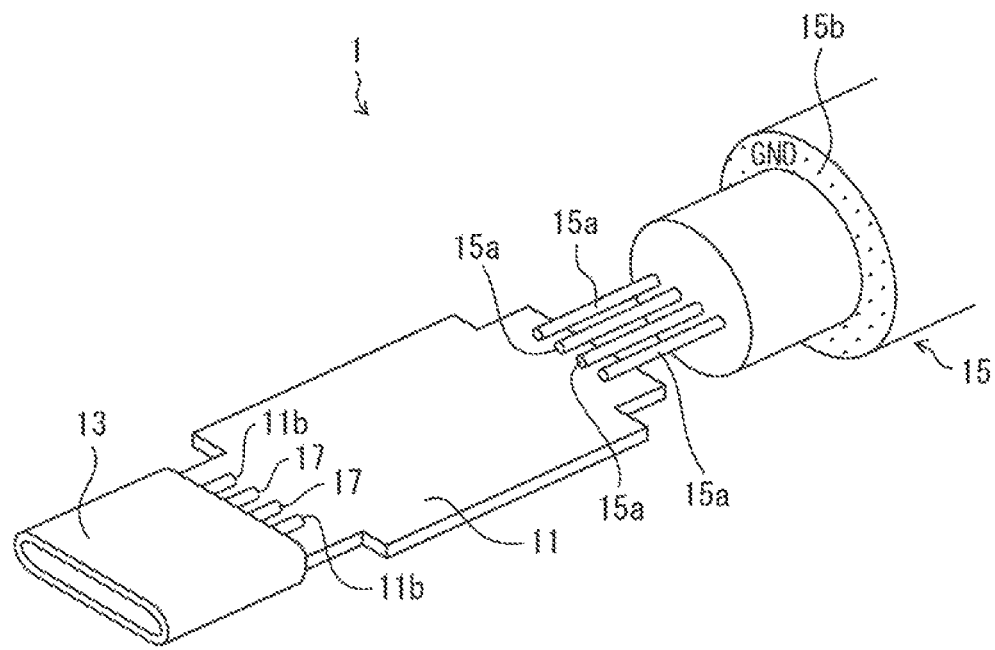
FIG. 2 is a view schematically illustrating (i) how terminals of a paddle card included in the plug-side connector in accordance with the reference embodiment are arranged and (ii) how the plug-side connector and the cable are connected to each other.
Figure 3:
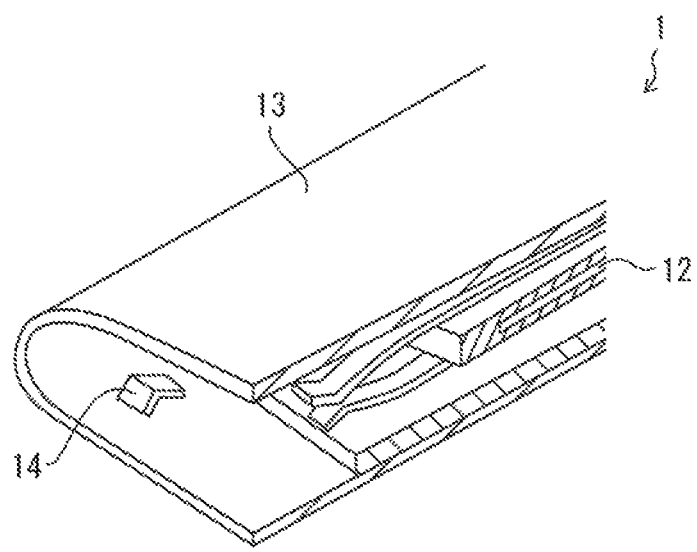
FIG. 3 is a cross-sectional view schematically illustrating an internal structure of a shell part included in the plug-side connector in accordance with the reference embodiment.

Main configurations of a plug-side connector 1 and a receptacle-side connector 2 will be described first with reference to FIGS. 1 through 3. FIG. 1 is a block diagram illustrating the main configurations of the plug-side connector 1 and the receptacle-side connector 2. FIG. 2 is a view schematically illustrating (i) how terminals of a paddle card 11 included in the plug-side connector 1 are arranged and (ii) how the plug-side connector 1 and the cable 15 are connected to each other. FIG. 3 is a cross-sectional view schematically illustrating an internal structure of a shell part 13.

In a case where the plug-side connector 1 is to be fitted together with the receptable-side connector 2 provided on the smartphone 600, the smartphone 600 and the AC adapter 500 are electrically connected to each other via the cable 15. In a case where the AC adapter 500 and the smartphone 600 are electrically connected to each other, the smartphone 600 can receive electric power from the AC adapter 500.

As illustrated in FIG. 1, the plug-side connector includes the paddle card 11, ground terminals 11b, a center plate (metal plate) 12, the shell part 13, a ground spring 14, and Vbus terminals 17 (power supply terminals; see FIG. 2). Specifically, the paddle card 11, the center plate 12, the ground spring 14, and the Vbus terminals 17 are provided in the shell part 13.

The paddle card 11 is, for example, a printed wiring board (PWB). On the paddle card 11, electronic components, an integrated circuit (IC), and the like (not illustrated) are mounted. At least the ground terminals 11b and the Vbus terminals 17 are provided at an end surface on a shell part 13-side of a surface of the paddle card 11 (see FIG. 2). Around electrode 11a of the paddle card 11 is (i) connected to the ground terminal 11b and (ii) connected, via a first capacitor (first protection element) 16a, to the center plate 12. In other words, the first capacitor 16a is provided between the center plate 12 and the ground electrode 11a. Note that the center plate 12 is a metal plate which serves as a ground plane.

Ground wires 15a of the cable 15 are connected to the ground electrodes 11a of the paddle card 11 via the ground terminals 11b (see FIG. 2). The shell part 13 is not caulked with an outer jacket (outer jacket of the cable) 15b of the cable 15. The outer jacket 15b is connected to the ground electrode 11a via a second capacitor (second protection element) 16b. In other words, the second capacitor 16b is provided between the outer jacket 15b and the ground electrode 11a. Note that the shell part 13 can be caulked with the outer jacket 15b, provided that the outer jacket 15b is connected to the ground electrode 11a via the second capacitor 16b.

The shell part 13 is a metal case which forms an outer profile of the plug-side connector 1 and which is electrically conducive. The shell part 13 is connected to the ground electrode 11a via a third capacitor (third protection element) 16c. In other words, the third capacitor 16c is provided between the shell part 13 and the ground electrode 11a.

As illustrated in FIG. 3, the ground spring 14 is provided on an inner wall surface of the shell part 13 so as to cause the plug-side connector 1 and the receptacle-side connector 2 to be more certainly fitted together. The ground spring 14 is also an electrically conducive metal member.

The first capacitor 16a, the second capacitor 16b, and the third capacitor 16c are each a protection element which prevents a short circuit from occurring between the ground electrodes 11a and the Vbus terminals 17. The capacitors 16a through 16c each have such a characteristic as having (i) a lower impedance with respect to an alternating current such as a high-frequency current and (ii) a higher impedance with respect to a direct current. Therefore, in a case where an overcurrent, which is a direct current, flows through the capacitors 16a through 16c, the capacitors 16a through 16c each have a high impedance. This prevents the overcurrent from flowing toward the ground electrodes 11a.

Therefore, even in a case where, for example, (i) a foreign substance intrudes or a water droplet adheres inside the shell part 13 and (ii) the Vbus terminals 17 are electrically connected to the center plate 12 and to the outer jacket 15b, it is still possible to effectively prevent a short circuit from occurring between the Vbus terminal 17 and the ground electrodes 11a via the center plate 12 and the like. In addition, even in a case where the Vbus terminal 17 and the shell part 13 are electrically connected, it is still possible to effectively prevent a short circuit from occurring between the Vbus terminal 17 and the ground electrode 11a via the shell part 13.

As illustrated in FIG. 1, the receptacle-side connector 2 includes a substrate 21, ground terminals 21b, a mid-plate (metal plate) 22, a shell part 23, and Vbus terminals (power supply terminals; see FIG. 8) 25. Specifically, the substrate 21, the ground terminals 21b, the mid-plate 22, and the Vbus terminals 25 are provided in the shell part 23.

The substrate 21 is, for example, a flexible printed circuit (FPC) which is a flexible circuit board. The substrate 21 includes (i) the ground terminals 21b which are to be connected to the ground terminals 11b of the plug-side connector 1 and (ii) the Vbus terminals 25 which are to be connected to the Vbus terminals 17 of the plug-side connector 1. The ground electrode 21a of the substrate 21 is connected, via a first capacitor (first protection element) 24a, to the mid-plate 22 which is a metal plate to serve as a ground plane. In other words, the first capacitor 24a is provided between the mid-plate 22 and the ground electrode 21a.

The shell part 23 is a meatal case which forms an outer profile of the receptacle-side connector 2 and which is electrically conducive. The shell part 23 is connected to the ground electrode 21a via a second capacitor (second protection element) 24b. In other words, the second capacitor 24b is provided between the shell part 23 and the ground electrode 21a. The shell part 23 is fitted together with the shell part 13 of the plug-side connector 1. In so doing, an outer wall surface of the shell part 23 is pressured by the ground spring 14.

The first capacitor 24a and the second capacitor 24b are each a protection element which prevents a short circuit from occurring between the ground electrode 21a and the Vbus terminal 25. The capacitors 24a and 24b also each have such a characteristic as having (i) a lower impedance with respect to an alternating current such as a high-frequency current and (ii) a higher impedance with respect to a direct current. Therefore, even in a case where, for example, (i) a foreign substance intrudes or a water droplet adheres inside the shell part 23 and (ii) the Vbus terminals 25 are electrically connected to the mid-plate 22 and to the shell part 23, it is still possible to effectively prevent a short circuit from occurring between the Vbus terminals 25 and the ground electrodes 21a via the mid-plate 22 and the like.

As described above, the plug-side connector 1 and the receptacle-side connector 2 each include capacitors as measures to prevent a short circuit. This prevents, for example, a short circuit from occurring in one connector as a result of a short circuit that has occurred on the other connector.

<Connection Structures of Capacitors>

Figure 4:
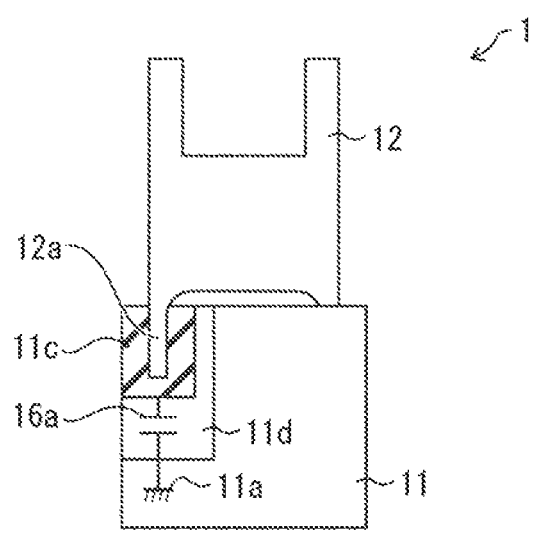
FIG. 4 is a view schematically illustrating a connection structure of a first capacitor provided in the plug-side connector in accordance with the reference embodiment.
Figure 5:
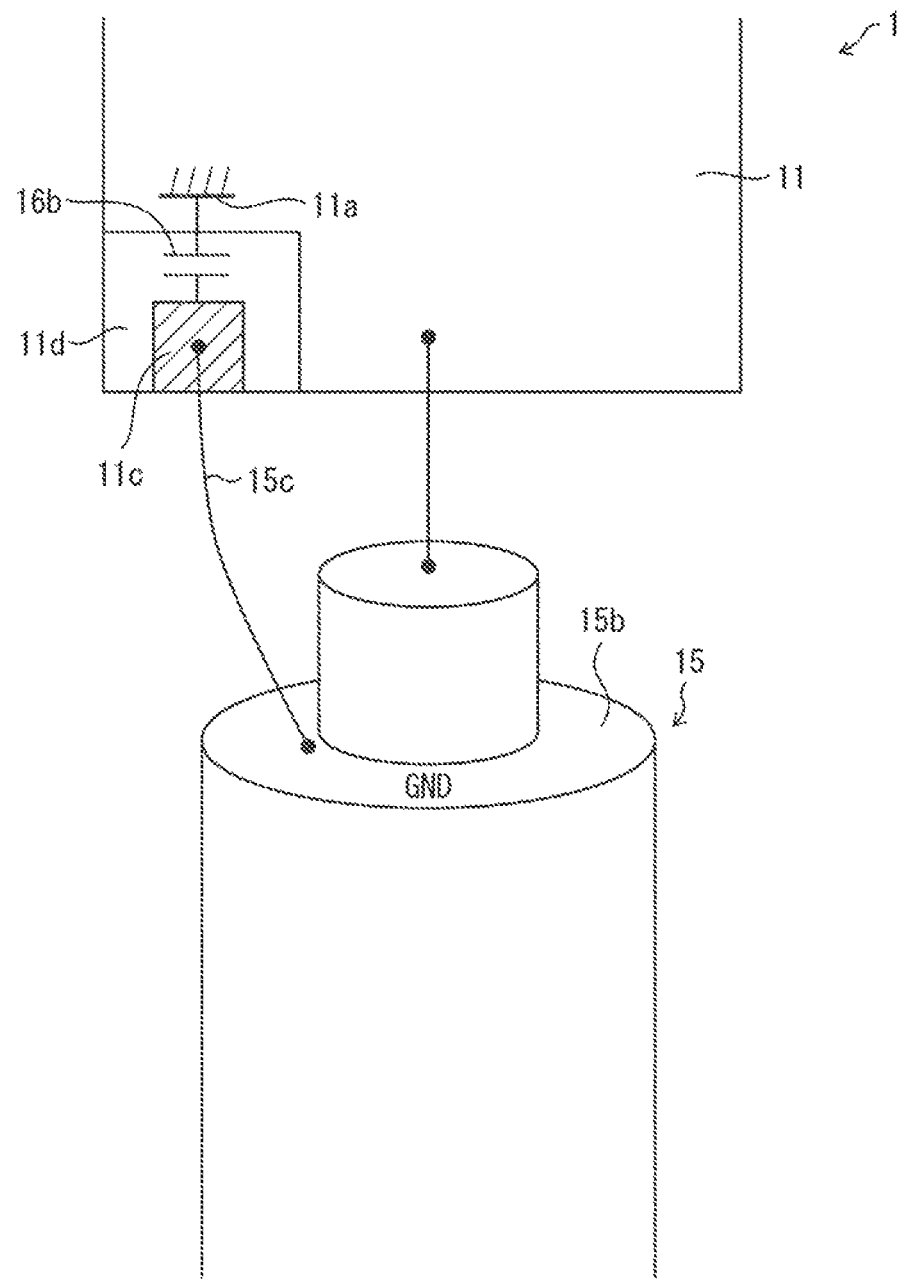
FIG. 5 is a view schematically illustrating a connection structure of a second capacitor provided in the plug-side connector in accordance with the reference embodiment.
Figure 6:
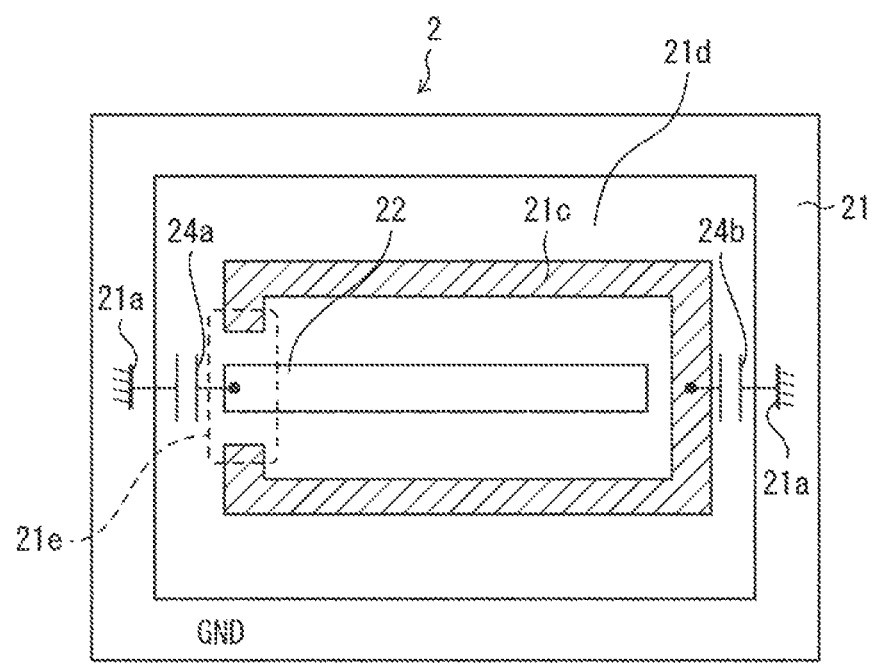
FIG. 6 is view schematically illustrating the connection structure of the first capacitor and the second capacitor which are provided in the receptacle-side connector in accordance with the reference embodiment.

Connection structures of the capacitors provided in the plug-side connector 1 and the receptacle-side connector 2 will be described next with reference to FIGS. 4 through 6. FIG. 4 is a view schematically illustrating the connection structure of the first capacitor 16a provided in the plug-side connector 1. FIG. 5 is a view schematically illustrating the connection structure of the second capacitor 16b provided in the plug-side connector 1. FIG. 6 is a view schematically illustrating the connection structure of the first capacitor 24a and the second capacitor 24b which are provided in the receptacle-side connector 2.

As illustrated in FIG. 4, an extending part 12a of the center plate 12 is placed on a region of the paddle card 11, and a clearance 11d is formed in the vicinity of the region so that the region serves as an island 11c. Then, the extending part 12a is soldered to the island 11c, and the first capacitor 16a connects the island 11c and the ground electrode 11a to each other.

As illustrated in FIG. 5, a tip part of a wire 15c, which is connected to the outer jacket 15b of the cable 15, is placed on a region of the paddle card 11, and a clearance 11d is formed in the vicinity of the region so that the region serves as an island 11c. Then, the tip part of the wire 15c is soldered to the island 11c, and the second capacitor 16b connects the island 11c and the ground electrode 11a to each other.

As illustrated in FIG. 6, an opening (not illustrated) of the shell part 23, which opening is opposite an opening 23a of the shell part 23, is connected to a region of the substrate 21, and a clearance 21d is formed in the vicinity of the region so that the region serves as an island 21c having a shape corresponding to that of the opening. Then, the opening the shell part 23 is connected to the island 21c, and the second capacitor 24b connects the island 21 and the ground electrode 21a to each other.

A clearance 21e is further formed on part of the island 21c. Then, the first capacitor 24a connects the mid-plate 22 and the ground electrode 21a to each other via the clearance 21e.

In the present reference embodiment, the capacitors are each used as a protection element which is a countermeasure for short circuit. Note, however, that it is possible to employ, as a protection element, an element different from the capacitors, provided that such an element has a characteristic that an impedance with respect to an alternating current becomes lower and an impedance with respect to a direct current becomes higher. Examples of the protection element other than the capacitors encompass a polymer PTC thermistor having a positive temperature coefficient. That is, the PTC thermistor has the positive temperature characteristic that a resistance increases as a temperature rises, and therefore a resistance of the PTC thermistor increases by heat that is generated when an overcurrent flows. Meanwhile, in a case where an alternating current flows, a temperature does not rise and accordingly a resistance does not increase. As such, the PTC thermistor serves as a device which has a lower impedance with respect to an alternating current and as a device which has a higher impedance with respect to a direct current. From this, the PTC thermistor can be used as a protection element.

The configurations of the plug-side connector 1 and the receptacle-side connector 2 in accordance with the present reference embodiment can be applied to any connector in general which (i) includes Vbus terminals, ground terminals, and a ground potential part (corresponding to, for example, the center plate 12), (ii) includes a shell part having a ground potential, and (iii) is configured so that a short circuit may occur between the Vbus terminals and ground electrodes of a substrate via the ground potential part.

Embodiment 1

The following description will discuss an embodiment of the present invention with reference to FIGS. 7 through 9. For convenience, members which are identical in function to the members described in the previous embodiments are given respective identical reference signs, and descriptions of those members are omitted.

A receptacle-side connector 3 in accordance with Embodiment 1 is different from the receptacle-side connector 2 in accordance with the reference embodiment in that the receptacle-side connector 3 includes a mid-plate (metal plate) 32 instead of the mid-plate 22. In this case, the smart phone 600 includes the receptacle-side connector 3.

<Configuration of Receptacle-Side Connector>

First, the following description will discuss a main configuration of the receptacle-side connector 3 in accordance with Embodiment 1 with reference to FIG. 7. (a) of FIG. 7 is a perspective view schematically illustrating a configuration of the receptacle-side connector 3. (b) of FIG. 7 is a cross-sectional view schematically illustrating an internal structure of the receptacle-side connector 3.

As illustrated in (a) and (b) of FIG. 7, the receptacle-side connector 3 includes a mid-plate 32 and a shell part 23. Further, the receptacle-side connector 3 includes two terminal blocks 37 in each of which ground terminals 21b, Vbus terminals 25, and signal terminals 36 are arranged so as to face a surface 32c of the mid-plate 32 (see FIG. 8 and FIG. 9). Specifically, inside the shell part 23, the mid-plate 32 is placed between the two terminal blocks 37.

Note that the number of pieces of the terminal blocks 37 can be more than two, provided that the mid-plate 32 is placed between two terminal blocks 37. Moreover, the other terminal block(s) 37 other than those two terminal blocks 37 can be arbitrarily designed in terms of position inside the shell part 23.

The mid-plate 32 is a metal plate which serves as a ground plane, as with the mid-plate 22 in accordance with the reference embodiment. The mid-plate 32 is covered with a resin part (insulating member) 38 having electrically insulating property except for an end surface on a terminal contact side so that the surface 32c and an end surface of the mid-plate 32 on an opening 23a side of the shell part 23 are not exposed.

<Shape of Mid-Plate and Positional Relation with Terminal Block>

The following description will discuss, with reference to FIG. 8 and FIG. 9, a shape of the mid-plate 32 and a positional relation between the mid-plate 32 and the terminal block 37. FIG. 8 is a view schematically illustrating a shape of the mid-plate 32 and a positional relation between the mid-plate 32 and the terminal block 37. (a) of FIG. 9 is a cross-sectional view illustrating a configuration of main parts of the receptacle-side connector 3 viewed in a cross section that is defined by a direction in which the Vbus terminal 25 extends and a direction perpendicular to the surface 32c of the mid-plate 32. (b) of FIG. 9 is a cross-sectional view illustrating a configuration of main parts of the receptacle-side connector 3 viewed in a cross section that is defined by a direction in which the signal terminal 36 extends and a direction perpendicular to the surface 32c of the mid-plate 32.

As illustrated in FIG. 8, the mid-plate 32 has a shape in which end surface parts 32a, which are on the opening 23a side and correspond to positions at which the respective Vbus terminals 25 are provided (i.e., an edge surface of the metal plate on an opening side of the shell part), are set back toward an opposite side of the opening 23a.

In other words, as illustrated in (a) of FIG. 9, the mid-plate 32 has a shape in which an edge surface (i.e., the end surface part 32a) of the mid-plate 32 on the opening 23a side is set back toward an opposite side of the opening 23a when viewed in a cross section defined by a direction in which the Vbus terminal 25 extends and a direction perpendicular to the surface 32c. Moreover, the resin part 38 covering the mid-plate 32 has thicknesses as follows: that is, a thickness of a part of the resin part 38 covering the end surface parts 32a on the opening 23a side is greater than a thickness of another part of the resin part 38 covering, on the opening 23a side, the other end surface parts (i.e., end surface parts corresponding to positions at which the ground terminals 21b and the signal terminals 36 are provided) other than the end surface parts 32a.

In a case where the mid-plate 32 has such a shape, for example, even in a case where a tip part of the resin part 38 on the opening 23a side is chipped off (i.e., dented) to some extent due to repetition of insertion and removal of the plug-side connector 1, the end surface parts 32a are present inside the resin part 38 without being exposed. Therefore, even in a case where a foreign substance intrudes or a water droplet adheres inside the shell part 23 in a state in which the tip part is exposed on the opening 23a side, it is possible to prevent the mid-plate 32 from being electrically connected to the Vbus terminal 25 via the foreign substance or the like.

In this case, in the end surface of the mid-plate 32 on the opening 23a side, the mid-plate 32 has a shape in which end surface parts 32b (i.e., an edge surface of the metal plate on the opening side of the shell part) which correspond to positions at which the respective signal terminals 36 are provided closer to the opening 23a, as compared with the end surface parts 32a which correspond to the positions at which the respective Vbus terminals 25 are provided (see FIG. 8).

In other words, as illustrated in (b) of FIG. 9, the mid-plate 32 has a shape in which the end surface part 32b in a cross section defined by a direction in which the signal terminal 36 extends and a direction perpendicular to the surface 32c is located closer to the opening 23a, as compared with the end surface part 32a in a cross section defined by a direction in which the Vbus terminal 25 extends and a direction perpendicular to the surface 32c.

In a case where the mid-plate 32 has such a shape, for example, it is possible to effectively carry out impedance matching and to inhibit unnecessary radiation in high-speed transmission. Moreover, in a case where a noise comes from the outside toward a signal line (not illustrated), the mid-plate 32 can effectively cut the noise. From this, it is possible to reduce influence by unnecessary radiation and an external noise while preventing a short circuit from occurring between the Vbus terminal 25 and the ground electrode 21a.

Note that a purpose of designing the mid-plate 32 to have the above described shape is mainly to prevent the mid-plate 32 and the Vbus terminal 25 from being electrically connected to each other. This purpose can be achieved by designing the shape of the mid-plate 32 such that a tip surface 25a of the Vbus terminal 25 is located closer to the opening 23a as compared with the end surface part 32a. Therefore, the shape of the mid-plate 32 does not necessarily need to be designed such that the end surface part 32b is located closer to the opening 23a as compared with the end surface part 32a.

The receptacle-side connector 3 in accordance with Embodiment 1 can be applied to any connector in general which includes Vbus terminals and a ground potential part (corresponding to the mid-plate 32) that is surrounded and covered with an insulating member and in which the ground potential part is exposed, and in which a short circuit may occur between the Vbus terminal and a ground electrode of a substrate via the ground potential part.

Embodiment 2

As a receptacle-side connector in accordance with an embodiment of the present invention, variations different from the above described receptacle-side connector 3 are possibly employed. The following description will discuss details of a receptacle-side connector 4 in accordance with another embodiment of the present invention, with reference to (a) of FIG. 10. For convenience, members which are identical in function to the members described in Embodiment 1 and the reference embodiment are given respective identical reference signs, and descriptions of those members are omitted. (a) of FIG. 10 is a cross-sectional view schematically illustrating an internal structure of the receptacle-side connector 4 in accordance with the another embodiment of the present invention.

The receptacle-side connector in accordance with an embodiment of the present invention encompasses a receptacle-side connector 4. In the receptacle-side connector 4, a thickness (in a direction perpendicular to the surface 32c of the mid-plate 32) of an end part 48a of a resin part 48 on the opening 23a side of the shell part 23 is greater than a thickness (in the same direction) of a part of the resin part 48 which part covers the surface 32c (see (a) of FIG. 10). The resin part 48 is made of a resin having an electrically insulating property, as with the resin part 38. In this case, the smart phone 600 includes the receptacle-side connector 4.

In a case where the resin part 48 has the above described shape, it is possible to prevent a tip part of the mid-plate 32 on the opening 23a side from being exposed, even in a case where the vicinity of the end part 48a is chipped off to some extent. It is therefore possible to more surely prevent the mid-plate 32 and the Vbus terminal 25 from being electrically connected to each other.

Embodiment 3

The following description will discuss details of a receptacle-side connector in accordance with another embodiment of the present invention, with reference to (b) of FIG. 10. For convenience, members which are identical in function to the members described in previous embodiments and the reference embodiment are given respective identical reference signs, and descriptions of those members are omitted. (b) of FIG. 10 is a cross-sectional view schematically illustrating an internal structure of the receptacle-side connector 5 in accordance with the another embodiment of the present invention.

A receptacle-side connector in accordance with an embodiment of the present invention encompasses a receptacle-side connector 5. In the receptacle-side connector 5, an abrasion-resistant coating 58b which is, for example, a diamond-like carbon (DLC) coating or the like having an electrically insulating property is applied to an end part 58a of a resin part 58 on the opening 23a side of the shell part 23 (see (b) of FIG. 10). The resin part 58 is also made of a resin having an electrically insulating property, as with the resin parts 38 and 48. In this case, the smart phone 600 includes the receptacle-side connector 5.

In a case where the end part 58a of the resin part 58 is processed as above described, it is possible to prevent the tip part of the mid-plate 32 on the opening 23a side from being exposed, even in a case where insertion and removal between the receptacle-side connector 5 and a plug-side connector which fits with the receptacle-side connector 5 are repeated to some extent. It is therefore possible to more certainly prevent the mid-plate 32 and the Vbus terminal 25 from being electrically connected to each other.

Note that, although not illustrated, the abrasion-resistant coating 58b can be applied to the end part 48a of the resin part 48. In a case where such a configuration is employed, it is possible to more certainly reduce a case where the tip part of the mid-plate 32 on the opening 23a side is exposed.

[Recap]

A receptacle-side connector (3, 4, 5) in accordance with an aspect 1 of the present invention is a receptacle-side connector which is provided in an electronic apparatus (smartphone 600) and is used to electrically connect the electronic apparatus to an external apparatus (AC adapter 500) by fitting together with a plug-side connector (1) for electrically connecting the electronic apparatus to the external apparatus via a cable (15), the receptacle-side connector including: at least a terminal block (37) including a power supply terminal (Vbus terminal 25), a ground terminal (21b), and a signal terminal (36), the receptacle-side connector further including: a metal plate (mid-plate 32) which serves as a ground plane; and a shell part (23) which forms an outer profile of the receptacle-side connector and which is electrically conducive, in the shell part, an edge surface (end surface part 32a) of the metal plate, which edge surface is located at an end surface facing a first side toward an opening (23a) of the shell part and which corresponds to a position of the power supply terminal, being shaped so as to set back toward a second side opposite the first side.

According to the configuration, the receptacle-side connector in accordance with an embodiment of the present invention is configured so that the edge surface of the metal plate, which edge surface is located at the end surface facing the first side toward the opening of the shell part and which corresponds to the position of the power supply terminal, is shaped so as to set back toward the second side opposite the first side. Therefore, for example, even in a case where a tip part of the insulating member on the first side toward the opening of the shell part is chipped off (i.e., dented) to some extent due to repetition of insertion and removal of the plug-side connector, the edge surface corresponding to the position of the power supply terminal of the metal plate is present inside the insulating member without being exposed. Therefore, even in a case where a foreign substance intrudes or a water droplet adheres inside the shell part, it is possible to prevent the metal plate from being electrically connected to the power supply terminal via the foreign substance or the like.

Therefore, it is possible to provide a receptacle-side connector that can effectively prevent a short circuit from occurring between the power supply terminal and the ground electrode via the metal plate.

A receptacle-side connector in accordance with an aspect 2 of the present invention is a receptacle-side connector which is provided in an electronic apparatus and is used to electrically connect the electronic apparatus to an external apparatus by fitting together with a plug-side connector for electrically connecting the electronic apparatus to the external apparatus via a cable, the receptacle-side connector including: at least a terminal block including a power supply terminal, a ground terminal, and a signal terminal, the receptacle-side connector further including: a metal plate which serves as a ground plane; and a shell part which forms an outer profile of the receptacle-side connector and which is electrically conducive, when viewed in a cross section defined by a direction in which the power supply terminal extends and by a direction perpendicular to a surface (32c) of the metal plate, an edge surface (end surface part 32a) of the metal plate, which edge surface is facing a first side toward an opening of the shell part, being shaped so as to set back toward a second side opposite the first side.

According to the configuration, for example, even in a case where a tip part of the insulating member on the first side toward the opening of the shell part is chipped off (i.e., dented) to some extent due to repetition of insertion and removal of the plug-side connector, the edge surface corresponding to the position of the power supply terminal of the metal plate is not exposed to outside of the insulating member. Therefore, even in a case where a foreign substance intrudes or a water droplet adheres inside the shell part, it is possible to prevent the metal plate from being electrically connected to the power supply terminal via the foreign substance or the like.

In an aspect 3 of the present invention, the receptacle-side connector in accordance with the aspect 1 or 2 is preferably configured so that a first edge surface of the metal plate is located closer to the opening of the shell part than is a second edge surface of the metal plate when (i) the first edge surface (end surface part 32b) is viewed in a cross section defined by a direction in which the signal terminal extends and by a direction perpendicular to a surface (32c) of the metal plate and (ii) the second edge surface is viewed in a cross section defined by a direction in which the power supply terminal extends and by the direction perpendicular to the surface of the metal plate.

According to the configuration, the receptacle-side connector in accordance with an embodiment of the present invention is configured so that the first edge surface of the metal plate is located closer to the opening of the shell part than is the second edge surface of the metal plate when (i) the first edge surface is viewed in the cross section defined by the direction in which the signal terminal extends and by the direction perpendicular to the surface of the metal plate and the second edge surface is viewed in the cross section defined by the direction in which the power supply terminal extends and by the direction perpendicular to the surface of the metal plate. Therefore, one region of the metal plate, which one region faces the power supply terminal, is larger in area than another region which faces the signal terminal. Therefore, for example, it is possible to effectively carry out impedance matching and to inhibit unnecessary radiation in high-speed transmission. In addition, in a case where (i) the tip part of the metal plate, which tip faces the opening of the shell part, is exposed and (ii) a noise comes from the outside toward a signal line connected to the signal terminal, the metal plate can effectively cut the noise.

Therefore, it is possible to provide a receptacle-side connector that is hardly influenced by unnecessary radiation and an external noise, while preventing a short circuit from occurring between the power supply terminal and the ground electrode.

In an aspect 4 of the present invention, the receptacle-side connector (4) in accordance with any one of the aspects 1 through 3 is preferably configured so that: the edge surface of the metal plate, which edge surface is facing the opening of the shell part, is covered with an insulating member (resin part 48); and an end part (48a) of the insulating member, which end part is facing the opening of the shell part, is greater in thickness than another part of the insulating member, which another part is covering the surface of the metal plate, the thickness being measured along a direction perpendicular to a surface of the metal plate.

According to the configuration, the end part of the insulating member, which end part is facing the opening of the shell part, is greater in thickness than another part of the insulating member, which another part is covering the surface of the metal plate, the thickness being measured along the direction perpendicular to the surface of the metal plate. Therefore, the tip part of the metal plate, which tip part is facing the opening of the shell part, is not exposed even in a case where the vicinity of the end part of the insulating member, which end part is facing the opening of the shell part, is chipped off to some extent.

Therefore, it is possible to more certainly prevent an electrical connection between the metal plate and the power supply terminal. This makes it possible to effectively prevent a short circuit from occurring between the power supply terminal and the ground electrode via the metal plate.

In an aspect 5 of the present invention, the receptacle-side connector (5) in accordance with any one of the aspects 1 through 4 is preferably configured so that: the edge surface of the metal plate, which edge surface is facing the opening of the shell part, is covered with an insulating member (resin part 58); and an abrasion-resistant coating (58b) is applied to an end part (58a) of the insulating member, which end part is facing the opening of the shell part.

According to the configuration, the end part of the insulating member, which end part faces the opening of the shell part, increases in abrasion resistance. Therefore, the insulating member is hardly chipped off even in a case where insertion and removal between the receptacle-side connector in accordance with an embodiment of the present invention and a plug-side connector, which fits together with the receptacle-side connector, are repeated to some extent. This prevents the tip part of the metal plate, which tip part faces the opening of the shell part, from being exposed.

Therefore, it is possible to more certainly prevent an electrical connection between the metal plate and the power supply terminal. This makes it possible to effectively prevent a short circuit from occurring between the power supply terminal and the ground electrode via the metal plate.

The electronic apparatus in accordance with an aspect 6 of the present invention preferably includes a receptacle-side connector in accordance with any one of the aspects 1 through 5.

According to the configuration, it is possible to provide the electronic apparatus which includes the receptacle-side connector that can effectively prevent a short circuit from occurring between the power supply terminal and the ground electrode.

[Remarks]

The plug-side connector (1) in accordance with an aspect 1 of the reference embodiment is a plug-side connector for electrically connecting an electronic apparatus (smartphone 600) to an external apparatus (AC adapter 500) via a cable (15) by fitting together with a receptable-side connector (2, 3, 4, 5) that is provided in the electronic apparatus, the plug-side connector including: a shell part (13) which is electrically conductive and forms an outer profile of the plug-side connector; a power supply terminal (Vbus terminal 17); a metal plate (center plate 12) which serves as a ground plane; a first protection element (first capacitor 16a) which is provided between the metal plate and a ground electrode (11a); and a second protection element (second capacitor 16b) which is provided between an outer jacket (15b) of the cable and the ground electrode, at least the power supply terminal and the metal plate being provided inside the shell part, the first protection element having a characteristic of having a lower impedance with respect to an alternating current and of having a higher impedance with respect to a direct current, and the second protection element having a characteristic of having a lower impedance with respect to an alternating current and of having a higher impedance with respect to a direct current.

From this, the impedance between the metal plate and the ground electrode and the impedance between the outer jacket of the cable and the ground electrode are high with respect to a direct current. Therefore, for example, even in a case where a foreign substance intrudes or a water droplet adheres inside the shell part and therefore the power supply terminal is electrically connected to the metal plate and to the outer jacket of the cable, it is possible to effectively prevent a short circuit from occurring between the power supply terminal and the ground electrode via the metal plate or the like.

In the plug-side connector in accordance with an aspect 2 of the reference embodiment, it is preferable in the aspect 1 that each of the first protection element and the second protection element is a capacitor.

Therefore, it is possible to allow a high frequency noise component or the like to reach the ground electrode while securing a high impedance state with respect to a direct current at a location between the metal plate and the ground electrode and at a location between the outer jacket of the cable and the ground electrode. From this, it is possible to provide the plug-side connector that is hardly influenced by an external noise and the like and enables high-speed transmission, while preventing a short circuit from occurring between the power supply terminal and the ground electrode.

The plug-side connector in accordance with an aspect 3 of the reference embodiment is a plug-side connector for electrically connecting an electronic apparatus to an external apparatus via a cable by fitting together with a receptable-side connector that is provided in the electronic apparatus, the plug-side connector including: a shell part which is electrically conductive and forms an outer profile of the plug-side connector; a power supply terminal; a metal plate which serves as a ground plane; a first protection element which is provided between the metal plate and a ground electrode; and a third protection element (third capacitor 16c) which is provided between the shell part and the ground electrode, at least the power supply terminal and the metal plate being provided inside the shell part, the first protection element having a characteristic of having a lower impedance with respect to an alternating current and of having a higher impedance with respect to a direct current, and the third protection element having characteristic of having a lower impedance with respect to an alternating current and of having a higher impedance with respect to a direct current.

Therefore, the impedance with respect to a direct current is higher not only at a location between the metal plate and the ground electrode but also at a location between the shell part and the ground electrode. Therefore, for example, even in a case where a foreign substance intrudes or a water droplet adheres inside the shell part and therefore the power supply terminal is electrically connected to the shell part, it is possible to effectively prevent a short circuit from occurring between the power supply terminal and the ground electrode via the shell part.

In the plug-side connector in accordance with an aspect 4 of the reference embodiment, it is preferable in the aspect 3 that each of the first protection element and the third protection element is a capacitor.

It is therefore possible to allow a high frequency noise component or the like to reach the ground electrode while securing a high impedance state with respect to a direct current at a location between the metal plate and the ground electrode and at a location between the shell part and the ground electrode.

The receptacle-side connector (2) in accordance with an aspect 5 of the reference embodiment is a receptacle-side connector which is provided in an electronic apparatus and is used to electrically connect the electronic apparatus to an external apparatus by fitting together with a plug-side connector for electrically connecting the electronic apparatus to the external apparatus via a cable, the receptacle-side connector including: a shell part (23) which is electrically conductive and forms an outer profile of the receptacle-side connector; a power supply terminal (Vbus terminal 25); a metal plate (mid-plate 22) which serves as a ground plane; a first protection element (first capacitor 24a) which is provided between the metal plate and a ground electrode (21b); and a second protection element (second capacitor 24b) which is provided between the shell part and the ground electrode, at least the power supply terminal and the metal plate being provided inside the shell part, the first protection element having a characteristic of having a lower impedance with respect to an alternating current and of having a higher impedance with respect to a direct current, and the second protection element having a characteristic of having a lower impedance with respect to an alternating current and of having a higher impedance with respect to a direct current.

From this, the impedance between the metal plate and the ground electrode and the impedance between the shell part and the ground electrode are high with respect to a direct current. Therefore, for example, even in a case where a foreign substance intrudes or a water droplet adheres inside the shell part and therefore the power supply terminal is electrically connected to the metal plate and to the shell part, it is possible to effectively prevent a short circuit from occurring between the power supply terminal and the ground electrode via the metal plate or the like.

In the receptacle-side connector in accordance with an aspect 6 of the reference embodiment, it is preferable in the aspect 5 that each of the first protection element and the second protection element is a capacitor.

It is therefore possible to provide the receptacle-side connector that is hardly influenced by an external noise and the like and enables high-speed transmission, while preventing a short circuit from occurring between the power supply terminal and the ground electrode.

The electronic apparatus in accordance with an aspect of the reference embodiment preferably includes a receptacle-side connector in accordance with the aspect 5 or 6.

It is therefore possible to provide the electronic apparatus which includes the receptacle-side connector that can effectively prevent a short circuit from occurring between the power supply terminal and the ground electrode.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Plug-side connector
2, 3, 4, 5 Receptacle-side connector
11a, 21a Ground electrode
11b, 21b Ground electrode
12 Center plate (metal plate)
13, 23 Shell part
15 Cable
15b Outer jacket (outer jacket of cable)
16a, 24a First capacitor (first protection element)
16b, 24b Second capacitor (second protection element)
16c Third capacitor (third protection element)
17, 25 Vbus terminal (power supply terminal)
22, 32 Mid-plate (metal plate)
23a Opening (opening of shell part)
25a Tip surface
32a End surface part (edge surface positionally corresponding to power supply terminal, end surface of metal plate on opening-side of shell part)
32b End surface part (edge surface positionally corresponding to power supply terminal, end surface of metal plate on opening-side of shell part)
32c Surface (surface of metal plate)
36 Signal terminal
37 Terminal block
38, 48, 58 Resin part (insulating member)
48a, 58a End part (end part of insulating member on opening-side of shell part)
58b Coating (abrasion-resistant coating
500 AC adapter (external apparatus)
600 Smartphone (electronic apparatus

The invention claimed is:

1. A receptacle-side connector which is provided in an electronic apparatus and is used to electrically connect the electronic apparatus to an external apparatus by fitting together with a plug-side connector for electrically connecting the electronic apparatus to the external apparatus via a cable, said receptacle-side connector comprising:
at least a terminal block including a power supply terminal, a ground terminal, and a signal terminal,
said receptacle-side connector further comprising:
a metal plate which serves as a ground plane; and
a shell part which forms an outer profile of the receptacle-side connector and which is electrically conductive,
in the shell part, an edge surface of the metal plate, which edge surface is located at an end surface facing a first side toward an opening of the shell part and which corresponds to a position of the power supply terminal, being shaped so as to set back toward a second side opposite the first side,
wherein a surface of the metal plate and an entirety of the edge surface of the metal plate, which edge surface is facing the opening of the shell part, are covered with an insulating member.

2. A receptacle-side connector which is provided in an electronic apparatus and is used to electrically connect the electronic apparatus to an external apparatus by fitting together with a plug-side connector for electrically connecting the electronic apparatus to the external apparatus via a cable, said receptacle-side connector comprising:
at least a terminal block including a power supply terminal, a ground terminal, and a signal terminal,
said receptacle-side connector further comprising:
a metal plate which serves as a ground plane; and
a shell part which forms an outer profile of the receptacle-side connector and which is electrically conductive,
when viewed in a cross section defined by a direction in which the power supply terminal extends and by a direction perpendicular to a surface of the metal plate, an edge surface of the metal plate, which edge surface is facing a first side toward an opening of the shell part, being shaped so as to set back toward a second side opposite the first side,
wherein a surface of the metal plate and an entirety of the edge surface of the metal plate, which edge surface is facing the opening of the shell part, are covered with an insulating member.

3. The receptacle-side connector as set forth in claim 1, wherein
a first edge surface of the metal plate is located closer to the opening of the shell part than is a second edge surface of the metal plate when (i) the first edge surface is viewed in a cross section defined by a direction in which the signal terminal extends and by a direction perpendicular to the surface of the metal plate and (ii) the second edge surface is viewed in a cross section defined by a direction in which the power supply terminal extends and by the direction perpendicular to the surface of the metal plate.

4. The receptacle-side connector as set forth in claim 1, wherein:
the surface of the metal plate and the edge surface of the metal plate, which edge surface is facing the opening of the shell part, is covered with the insulating member; and
an end part of the insulating member, which end part is facing the opening of the shell part, is greater in thickness than another part of the insulating member, which another part is covering the surface of the metal plate, the thickness being measured along a direction perpendicular to the surface of the metal plate.

5. The receptacle-side connector as set forth in claim 1, wherein:
the surface of the metal plate and the edge surface of the metal plate, which edge surface is facing the opening of the shell part, is covered with the insulating member; and
an abrasion-resistant coating is applied to an end part of the insulating member, which end part is facing the opening of the shell part.

6. An electronic apparatus comprising a receptacle-side connector recited in claim 1.

* * * * *